United States Patent [19] | [11] 4,038,493
Richards | [45] July 26, 1977

[54] METHOD AND APPARATUS FOR PHOTOTYPESETTING

[75] Inventor: John S. Richards, Bolingbrook, Ill.

[73] Assignee: Rockwell International Corporation, Pittsburgh, Pa.

[21] Appl. No.: 748,128

[22] Filed: Dec. 6, 1976

Related U.S. Application Data

[63] Continuation of Ser. No. 586,830, June 13, 1975, abandoned.

[51] Int. Cl.² .......... H04L 15/00; H04N 5/84
[52] U.S. Cl. .......... 178/15; 340/146.3 AC; 354/6; 358/214
[58] Field of Search .......... 178/15, 30, 178/DIG.6; 340/324 A, 324 AD, 146.3 AC; 354/5, 6, 9; 315/384, 385; 95/4.5; 358/6, 214, 215, 216

[56] References Cited

U.S. PATENT DOCUMENTS

| | | | |
|---|---|---|---|
| 2,963,544 | 12/1960 | Nieset | 354/9 |
| 3,005,042 | 10/1961 | Horsley | 358/6 |
| 3,291,015 | 12/1966 | Moyroud | 95/4.5 |
| 3,459,888 | 8/1969 | Sokolov | 178/DIG. 6 |
| 3,465,199 | 9/1969 | Simshauser | 315/385 |
| 3,529,521 | 9/1970 | Astley | 95/4.5 |
| 3,644,903 | 2/1972 | Kolb et al. | 340/146.3 X |
| 3,688,033 | 8/1972 | Hell et al. | 178/15 |
| 3,713,098 | 1/1973 | Muenchhausen et al. | 340/146.3 |
| 3,731,610 | 5/1973 | Kyte | 95/4.5 |
| 3,757,299 | 9/1973 | Perry | 340/146.3 |
| 3,772,465 | 11/1973 | Vlahos et al. | 358/6 |
| 3,804,978 | 4/1974 | Lemelson | 358/214 |
| 3,886,304 | 5/1975 | Scott et al. | 354/6 |

*Primary Examiner*—Thomas A. Robinson

[57] ABSTRACT

Method and apparatus for use in phototypesetting operations wherein a character, e.g. in transparency form, is scanned, for example, by a lightspot output of a cathode ray tube of the phototypesetting apparatus, processed to a suitable format and stored, e.g. in a magnetic storage medium, for subsequent phototypeset reproduction.

30 Claims, 12 Drawing Figures

Fig. 4A.
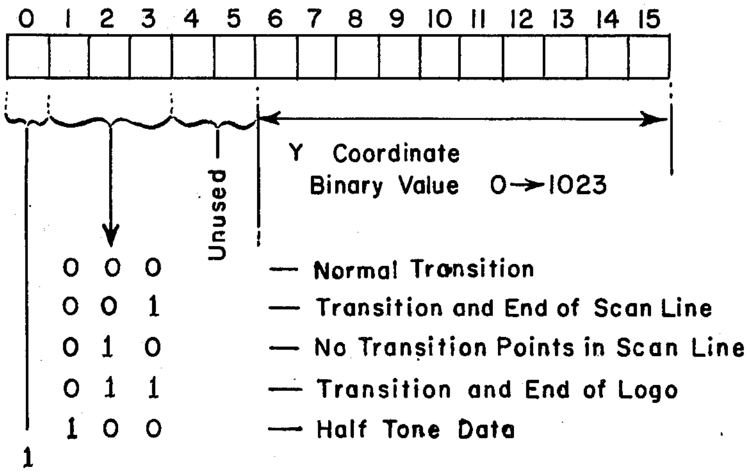
Fig. 7.
| Logo Scan | Record | Type Set |
|---|---|---|
| Fast – Bottom – Top | +X | – Y |
| Slow – Left – Right | +Y | – X |
Fig. 11.
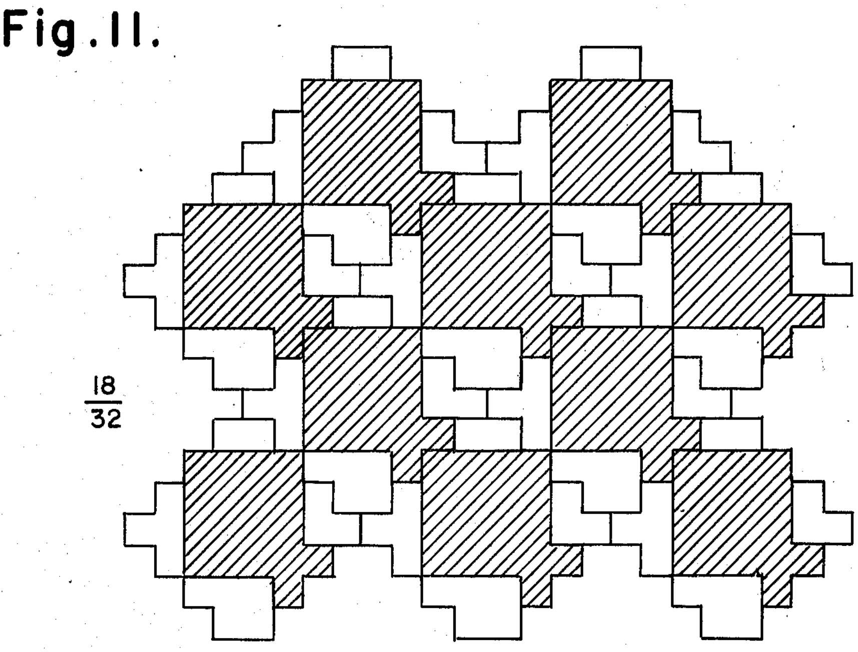

METHOD AND APPARATUS FOR PHOTOTYPESETTING

This is a continuation of application Ser. No. 586,830 filed June 13, 1975, now abandoned.

BACKGROUND OF THE INVENTION

1. Field of the Invention

The present invention relates to methods and apparatus for use in phototypesetting apparatus and more particularly to such methods and apparatus for processing characters for phototypesetting reproduction.

2. Description of the Prior Art

In phototypesetting apparatus marketed under the trade name "METRO SET" by the assignee of the present application, photosensitive material (film or paper) is directly exposed by the light output of a cathode ray tube which is provided with a fiber optic faceplate which is the face of the tube for culminating the light output therefrom for increasing the efficiency of light transfer to the photosensitive material, minimizing the light spot size and accurately exposing the photosensitive material. The copy which to be phototypeset is inputted into the apparatus via punched paper tape, magnetic tape, or direct computer link, which, in addition to its information content, selects the style, case, size, position (both vertically and horizontally) and slant of letters, if desired, of the type to be phototypeset. Stored in the apparatus on a magnetic disc are digital instructions for reproducing copy in up to one hundred master-type fonts of a common size. Under the control of a digital computer and in response to the input information, the scanning operation of the cathode ray tube is performed to sequentially access the coordinate points of the cathode ray tube screen with the digital instructions stored in the magnetic disc being outputted to processing circuitry for determining the light output of the cathode ray tube. The light output of the cathode ray tube as generated across the fiber optic faceplate thereof is representative of a line of type being set from left to right, with an individual letter being formed, for example, from the bottom to the top. The photosensitive material is exposed in response to the spot of light output of the cathode ray tube and is mechanically transported across the face of the fiber optic faceplate to be stored in a take-up cassette for eventual development by normal photographic techniques.

A typical format for the type in the font of master-type consists of a matrix of 1.024 bits by 1.024 bits in a normalized em quad of 1"× 1". Thus approximately one million bits of information are required to define the X, Y coordinate points in the format, with 0.001" being the spacial displacement of coordinate points. If bulk storage were to be employed this would require one million bits to define the coordinate points for each letter or symbol of each of the fonts. To avoid such a large storage capacity required in bulk storage, a processor is provided in the phototypesetting apparatus for compacting the digital instruction storage requirements. Thus, rather than storing individual coordinate point information, instructions in multi-bit digital word form are recorded on the font magnetic disc to which the compacting processor is responsive for producing the necessary outputs to control the cathode ray tube light output. A suitable compacting controller system and method to effect such storage and operation are disclosed in co-pending applications, Ser. Nos. 359,590 and 359,591 both filed on May 11, 1973 and assigned to the same assignee as the present application.

Each of the letters and symbols in a particular type style in each of the up to one hundred fonts must be encoded in digital instruction form for recording, which is an expensive and time-consuming operation, requiring that each letter and symbol be individually analyzed so that it can be properly encoded for providing appropriate instructions to the compacting processor. The time expense involved is justified in the case of providing fonts composed of typical letters and symbols commonly employed in phototypesetting operations. If, however, a user desires to phototypeset specialized characters, a serious problem arises in storing and encoding such characters not ordinarily found in a standard font. For example, if a newspaper has a need to print a particular company's trademark symbol in classified advertising, it would presently be necessary that this symbol by encoded and recorded according to the compacting system of the phototypesetting apparatus. As previously mentioned, this is an expensive and time-consuming operation. Present practice is for the phototypeset copy to be developed without eh specialized character with space being left for it. The character is then manually affixed to the copy for ultimate reproduction. Thus, the user of the phototypesetting apparatus is faced with the option of acquiring and storing individualized digital instructions for the specialized character compatible with the compacting processor used or to insert manually each specialized character on the developed phototypeset copy. Both options are, of course, expensive and time-consuming. The method and apparatus of the present invention are intended to provide the user with a further option of directly creating and storing the necessary instructions for recreating specialized characters as desired by the user.

Moreover, when specialized characters are to be employed, it is common that the phototypesetter would like to have the capability of producing the character in halftones as opposed to normal fulltone reproduction. A halftone capability wwould, thus, be highly desirable along with the capability of generating specialized characters not otherwise readily available in the standard font provided with the phototypesetting apparatus.

SUMMARY OF THE INVENTION

Broadly, the present invention provides a method an apparatus for use in phototypesetting operation wherein characters (not normally stored in thhe apparatus) may be scanned, processed and recorded in suitable format for later use in the reproduction of the character. Additionally, the method and apparatus provides the cabability of halftone reproduction of the character.

BRIEF DESCRIPTION OF THE DRAWINGS

FIG. 4A is a diagram used in explaining the record mode;

FIG. 7 is a chart showing the scan orientations in the record and typeset mode of operations;

FIGS. 9, 10 and 11 are schematic diagrams to be used in the explanation of the halftone mode of operation.

DESCRIPTION OF THE PREFERRED EMBODIMENT

Figure 1:
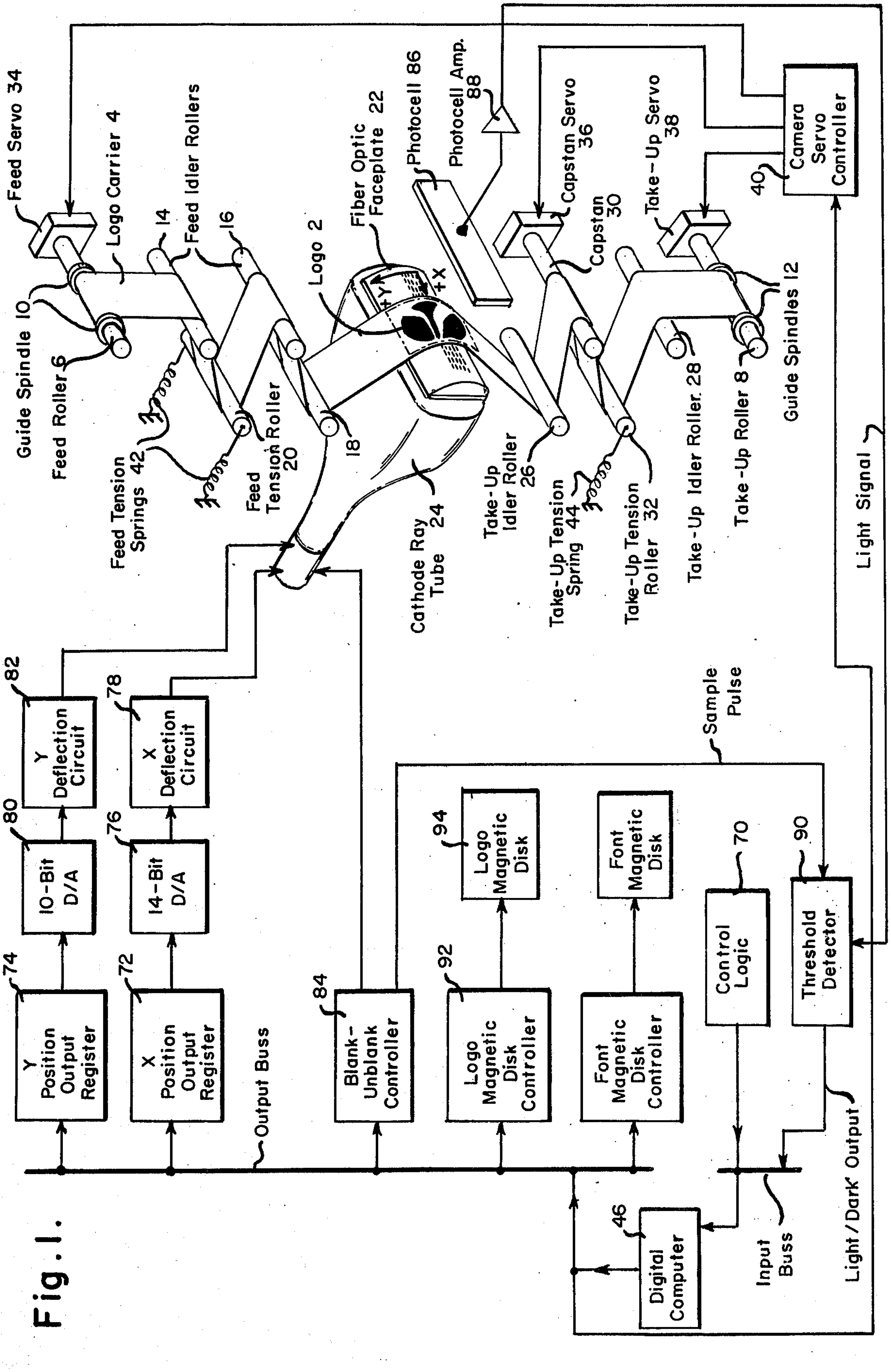
FIG. 1 is a simplified block-schematic diagram of the present invention set up in its record mode of operation.

Referring to FIG. 1, the system is shown schematically set up for operation in the record mode. A logo 2, in transparency form, is mounted on a logo carrier 4, which may comprise a transparent flexible material such as a polyester film. The logo 2 is aligned with respect to logo carrier 4 in a precise manner as will be discussed with respect to FIG. 2 below. The logo carrier 4 is wound at one end onto a feed roller 6 and at the other and thereof onto a take-up roller 8. Guide spindles 10 and 12 on the rollers 6 and 8, respectively restrain the logo carrier 4 in the proper position during loading and advancing operations. The logo carrier 4 is threoded around three feed idler rollers 14, 16 and 18, a feed tension roller 20, a fiber optic faceplate 22 of a cathode ray tube (CRI) 24, a pair of take-up idler rollers 26 and 28, a capstan 30 and a take-up tension roller 32. The logo carrier 4 is advanced across the fiber optic faceplate 22 by the feed roller 6, the capstan 30 and the take-up roller 8, which are respectively driven by a feed servo 34 connected to the feed roller 6, a capstan servo 36 connected to the capstan 30 and a take-up servo 38 connected to the take-up roller 8. During the record mode of operation proper tension is maintained on the logo carrier 4 by a camera servo controller 40 which drives the feed servo 34, the capstan servo 36 and the take-up servo 38. Also ensuring proper tensioning is a feed tension spring 42 biasing the feed tension roller 20 and a take-up tension spring 44 biasing the take-up tension roller 32. The input for controlling the camera servo controller 40 is provided from the output bus of a digital computer 46 of the phototypesetting apparatus.

Figure 2:
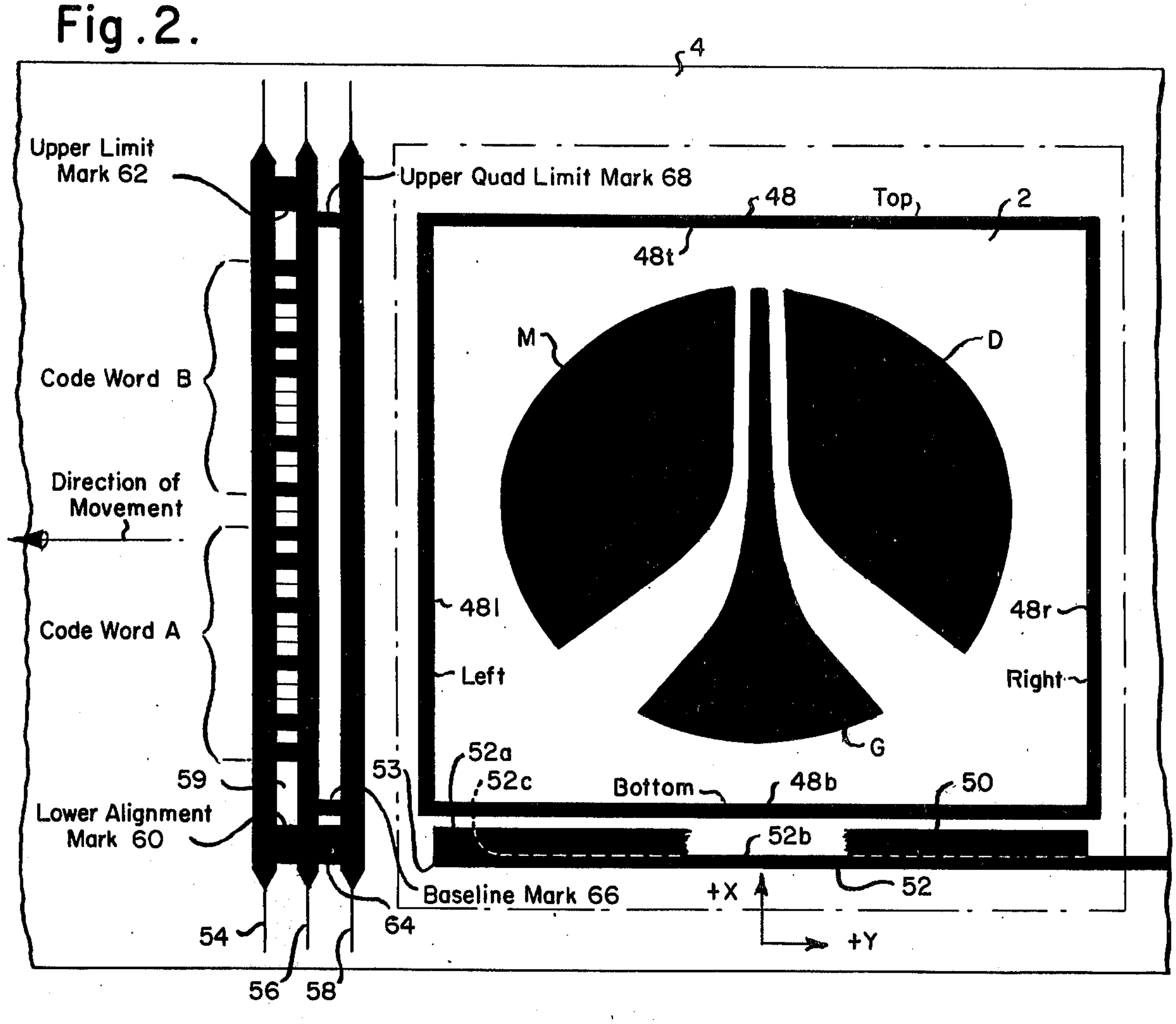
FIG. 2 is a schematic representation of a logo carrier having a logo fixed thereon for recording into the system of FIG. 1.

Reference is now made to FIG. 2 with illustrates how the logo 2 is aligned with respect to the logo carrier 4 and hence with respect to the fiber optic faceplate 22 of the CRT 24. In FIG. 2 the black areas are to be considered as being non-light transmitting areas, while the unshaded (white) areas are to be considered as transparent in both the logo and the logo carrier 4. The logo 2, in transparency form, includes the central symbolic character comprising three black areas M, G and D, which are bounded by a black border 48 having top 48*t*, bottom 48*b*, left side 481 and right side 48*r* portions. It is mandatory that the border 48 be black. The top, bottom, left and right directions are as shown on the drawing and the portions M, G, D will be described in the orientation as shown throughout the description. The bottom to top dimension 48*b* to 48*t* of the actual logo can be selected to be 8″, when an 8 to 1 enlargement factor is desired, considering the 1″× 1″ format employed in the phototypesetter apparatus for fonts permanently stored therein.

A bottom logo alignment bar 50 is provided parallel to the bottom border 48*b* of the logo on the transparency and disposed a predetermined distance therefrom. Permanently imprinted on the logo carrier 4 is a bottom carrier alignment bar 52. The carrier alignment bar 52 includes a left portion 52*a*, which is of a thickness equal to that of the logo alignment bar 50. The right top edge 52*c* of the left portion 52*a* slopes downwardly and a long thin bottom portion 52*b* formed which extends beyond the right edge of the logo alignment bear 50. The bar 50 is cut away in the central portion to show the bottom portion 52*b* of the carrier alignment bar 52. The logo alignment bar 50 is then brought into alignment with carrier alignment bar 52 with the lower left hand corner 53 of both bars serving as a reference point.

The logo 2 transparency is then fixed to the carrier 4 in this alignment by means, for example, such as adhesive tape. Proper alignment is important to ensure proper orientation of the logo upon reproduction.

Disposed to the left of and perpendicular to the logo and carrier alignment bars 50 and 52 are three opaque sync bars 54, 56 and 58 which extend from the bottom portion to the top portion of the carrier 4. Disposed between the bars 54 and 56 is a code word area 59 including a space for two 16-bit code words A and B. Below the code word A area is a bottom alignment mark 60 aligned with the carrier and logo alignment bars 52 and 50. At the top end of the code word B is an upper limit mark 62 for defining the upper limit of the X scan of the cathode ray tube. The code words A and B may be suitably encoded for supplying control information to the digital computer 46 as will be discussed in further detail below. Between the sync bars 56 and 58 is provided a lower alignment mark 64 in alignment with the bars 50 and 52. A base line mark 66 is provided to define the eventual alignment of the logo when reproduced with respect to the base line of type. An upper quad limit mark 68 is affixed to be in alignment with the top border 48*t* of the logo 2. The upper quad limit mark 68 may be moved and placed in accordance with the top border limit of the particular art work being used.

Figure 3:
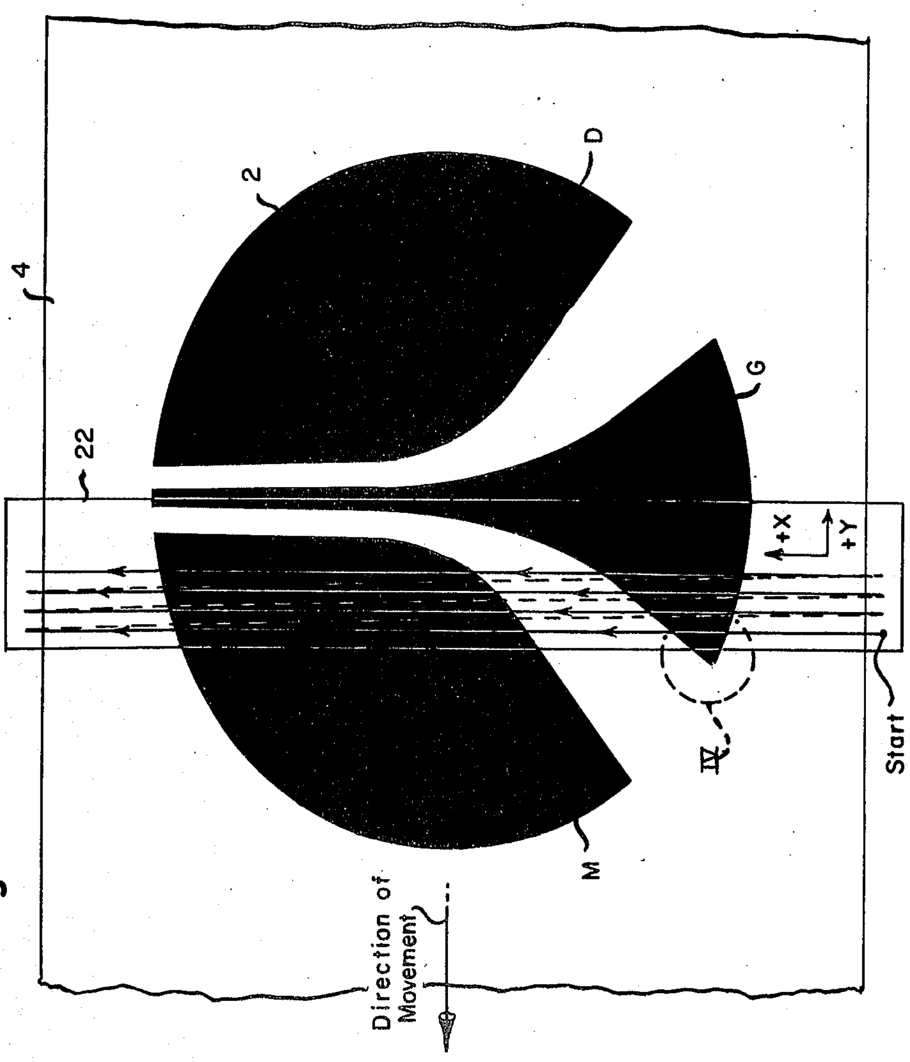
FIG. 3 is a schematic diagram used for explaining the operation of the record mode of operation.
Figure 4:
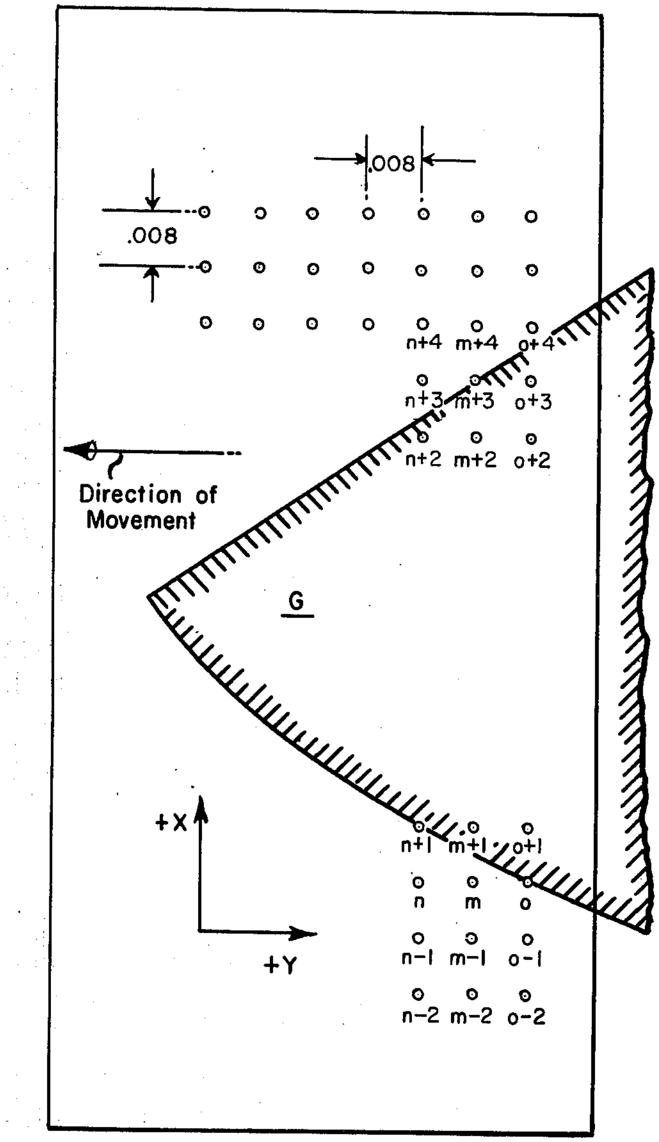
FIG. 4 is an enlarged portion of the area IV in FIG. 3.

Reference is now made to FIGS. 3 and 4. For simplicity in explaining the recording mode of operation, it will be described from the physical orientation a shown in FIG. 3, where the logo 2 is disposed on the logo carrier 4 over the fiber optic faceplate 22 so that the logo 2 has portions of the sections M and G thereof in a position to be scanned in the +X and +Y directions by the light output emitted by the cathode ray tube 24.

The sequence of operation in the record mode is as follows: In FIG. 1 a control logic circuit 70 is set to be the record mode and a logo access address is manually inputted so that access to the logo 2 being recorded can be provided for later use during the typeset mode. Using control circuit 70, an input is provided therefrom to the digital computer 46 which, in turn, provides on the output buss digital X and Y coordinate words to an X position output register 72 and a Y position output register 74 respectively. The registers 72 and 74 operate as temporary storage for the X and Y position words until the nexy X, Y data input thereto is supplied from the digital computer 46. The digital words stored in the registers 72 and 74 are indicative of the X and Y coordinate positions, respectively, that are to be sampled by the cathode ray tube by emitting a lightspot output therefrom. The X digital word stored in the register 72 is provided to a 14-bit digital/analog (D/A) converter 76 whose analog output is supplied to an X deflection circuit 78. In response to the activation of the X deflection circuit 78, the electron beam of the CRT 24 is deflected to an X position corresponding to the digital word stored in register 72. The Y digital word output of the register 74 is applied to a 10-bit digital/analog converter 80, whose analog output is applied to a y deflection circuit 82, which deflects the electron beam of the CRT 24 to a corresponding Y position.

The direction of the scan is shown in FIG. 3 from the start position in the lower left hand proceeding in the +X direction from the bottom to the top of the logo 2 and retracing to begin the next line of the scan in the +X direction indexed in the +Y direction by one line. Fast scan is then in the +X longitudinal direction and the slow scan is in the +Y transverse direction in the record mode of operation. The direction of movement of the logo carrier 4 is shown toward the left in FIG. 3; thus the logo is spot scanned from bottom to top (+X direction) in fast scan and from left to right (+Y direction) in slow scan. This orientation is required since the phototypeset operation is performed in this manner, with characters being formed from bottom to top and left to right to establish a line of print.

However, it should be noted that an important advantage results from fast scanning in +X longitudinal direction from bottom to top of the logo. The fiber optic faceplate 22 comprises a rectangle of approximately 11" in the Y direction. Thus, the scan pattern is limited to these parameters. By utilizing the longitudinal X direction for scanning from bottom to top of the logo the distance between sampling points is increased by the enlargement factor of the photo over the normalized em quad 1"× 1" format used for the typeset. Thus, if an 8" logo is provided from bottom to top, sampling may occur at 0.008" increments as compared to 0.001" increments if a 1"33 1" format were employed for the scan operation. This greatly minimized alignment problems and additionally eases the production of transparencies for the logo art work.

Referring to FIG. 4, assume that the digital computer 46 has established X and Y coordinates corresponding to the sampling point *n* with the next sampling point to be *n*+1. At the sampling point *n,* the computer 46 provides a signal to a blank-unblank controller 84, which has its output connected to a control grid of the CRT 24 causing the CRT to be unblanked thereby permitting the electron beam to excite the phosphor screen of the CRT at the sampling point *n* to provide a light output at this point from the fiber optic faceplate 22. Since the sampling point *n* is in a transparent point in the logo 2, the light output from the faceplate 22 will be transmitted through the logo 2 and sensed by a photocell 86. The dimensions of the photocell 86 (e.g. 9" × 1") are selected to permit sensing a light output transmitted through the transparent portions of the bottom to top dimension of the logo 2.

Hence, at the sample point *n* the photocell 86 is excited to provide a signal to a photocell amplifier 88 for amplification and which, in turn, provides a light signal to a threshold detector 90. The other input to the threshold detector 90 is a sample pulse provided by the blank-unblank controller 84. The sample pulse is provided in time correspondence to the unblanking of the cathode ray tube 24 so as to permit the threshold detector 90 to provide a light output signal therefrom if a light signal is inputted thereto from the photocell amplifier 88 at any time during the sampling interval for the spot *n.* Thus, in the present example, at the sample point *n,* a light output is provided to the input buss of the digital computer 46. Since the last previous sample point $n-1$ was also in a light area of the logo, no transition (light to dark or dark to light) occurred between $n-1$ and *n.* Thus, in that recording is performed on a transition basis, as will be explained in further detail below, no data is recorded for the point *n.*

At the end of the sample period for the point *n,* the digital computer 46 outputs a new digital coordinate word for the X position to the X position register 72 corresponding to the next sample point $n+1$ in the X dimension. The Y position output register continues to output the Y position corresponding to the n line of scan in the X dimension. The 14-bit D/A converter 76 thus outputs an analog signal corresponding to the sample point $n+1$ to the X deflection circuit 78 which causes the electron beam to index to the next sample position n+1. The blank-unblank controller 84 is unblanked in response to the output from the digital computer 46 so that the electron beam is provided at the $n+1$ location on the CRT screen to cause a light output therefrom. However, as can be seen from FIG. 4, the $n+1$ sample point is in a dark area of the logo 2 in the G portion thereof. Thus, no light output will be transmitted therethrough so that the photocell 86 will not sense a light output and provide a signal to the photo amplifier 88. Hence, the sample pulse supplied from the blank-unblank controller 84 to the threshold detector 90 for the sample point $n+1$ in the absence of a light signal input thereto will cause a dark output to be provided to the input buss of the digital computer 46.

Since a transition from light to dark has occurred from the sample point *n* to the sample point $n+1$, in response thereto the digital computer 46 will provide a transition output to logo magnetic disc controller 92, which, in turn, provides a digital output for recording on a logo magnetic disc 94. In addition, the address for the sample point $n+1$ where the transition occurred is provided for recording on the disc 94.

FIG. 4a illustrates the format employed for recording on the logo magnetic disc 94. A 16-bit format is employed with the 0 position having a binary 1 inserted in the first instruction so as to distinguish logo information from other characters. The next three bits (1, 2, 3) indicate the following information according to the truth table set forth on the figure, namely at the particular address under consideration: (a) a normal transition has occurred (000); (b) a transition and the end of a scan line has occurred (001); (c) no transition points in the scan line (010); (d) a transition, end of scan line and the end of a logo (011). Other information could also be stored, e.g., that halftone phototypesetting is desired (100), with the halftone density being recorded in the 6–15 positions. This will be discussed in further detail below. The next two bits (4, 5) are unused and the final ten bits are employed to establish the address of the coordinate in the X dimension, with the binary numbers 0 to 1023 establishing the 1024 sample points to be scanned during a given line, or a data field associated with the halftone word (100 in bits 1, 2, 3). Only address points are recorded where a transition occurs, or with the other information (b), (c), (d) is to be stored in the positions 1, 2, 3. This provides for economy of use of the disc 94 even though bulk storage technique is employed in the logo record mode. The direction of a transition need not be recorded because the mandatory blank border 48 on the logo 2 establishes the alternating sequence of transitions, upon reconstruction from the recorded transition information of the logo disc 94; i.e., the next transition point after the border 48 will of necessity be from light to dark.

As illustrated in FIG. 4, the sampling process will continue in the +X dimension. The dark output continues to be generated at each sampling point across the G portion of logo G through the sampling point $n+2$. When the electron beam of the CRT 24 is indexed to the next sampling point in the $n$ line, that is $n+3$, a light is transmitted through the transparent area of the carrier 4 and logo 2 so that the photocell 86 receives a light input thereto, which is amplified in the photocell amplifier 88 and provided as a light signal input to the threshold detector 90. The output of the threshold detector 90 is a light output and also indicates that a transition from dark to light has occurred to the digital computer 46. The indication is translated through the logo magnetic disc controller 92 for recording on the logo magnetic disc 94 as a transition at the address $n+3$. The sampling then continues in the $n$ line in 0.008" increments until the end of the $n$ line is reached. No transitions will be recorded, however, until a sample point in the $n$ column is reached where the bottom portion of the dark area M on the logo 2 is reached as is better seen in FIG. 3.

At the end of the $n$ line the electron beam retraces and is indexed in the +Y direction to the next line, that is the $m$ line, by the digital computer 46 providing the $m$ line address to the Y position output register 74. Thus, the converter 80 and the Y deflection circuit 82 responding thereto provide a corresponding Y deflection output to the electron beam to index the CRT to the $m$ line. The scan operation then begins in the +X direction with the points $m-2$ $m-1$, $m$ being sampled and found to be light areas, with a transition occurring with the sampling of the point $m+1$, which is indicated by recording in the digital format of FIG. 4A on the logo magnetic disc 94. The dark sampling points are indicated in the $m$ column until the sample point $m+4$ is reached, which indicates a transition point between the sample point $m+3$ and $m+4$, which is recorded. The sequence of operation continues along the $m$ line in the +X direction until its end. Next the CRT beam is indexed to the o line which is then scanned. This operation continues until the entire logo 2 is scanned in the +Y direction from left to right and the information corresponding to the address and transition points for the entire logo 2 is recorded in the logo magnetic disc 94.

In a typical implementation of the system the logo carrier 4 is stopped, for example, for six lines of scan and then indexed for an additional six lines before the next movement of the logo carrier 4. This is accomplished under the control of the digital computer 46 providing an input to the camera servo controller 40 at the time it is desired that the logo carrier 4 be moved. The camera servo controller 40 thus provides an output drive to the capstan servo 36, the feed servo 34 and the take-up servo 38, respectively, to effect the transport.

Referring back to FIG. 2, the initial portion of the record operation will be described as the logo carrier 4 is transported initially to a point where the spot output of the CRT 24 from the fiber optic faceplate 22 scans the first sync bar 54. The black sync bar 54 has a predetermined length in the X dimension in excess of the logo bottom to top dimension, and the dark output provided by the threshold detector 90 without any transitions to the digital computer 46 indicates that sync bar 54 has been reached. After the bar 54 has been scanned the code word area 59 including code words A and B are scanned. The function of these code words is to provide instructions with respect to the particular logo 2 which is to be scanned during the record mode of operation. Information may thus be coded in the code words A and B, for example, whether the logo 2 to be scanned is a positive or a negative transparency, whether it is a one, or multi-section logo, the magnification of the logo format with respect to the standard 1" × 1" quad format and halftone selection data. Of course, other information could be encoded in the code word area.

The second sync bar 56 is then scanned and acts as a separator between the code word line and the next line which includes the lower alignment mark 64 and the base line mark 66. These thus establish the relationship of the alignment bars 50 and 52 and the bottom border 48*b*. The bottom to top dimension of the logo 2 is established at the upper quad limit mark 68. The third sync bar 58 operates as a final separator between the input alignment and control characteristics provided on the logo carrier 4 and the logo 2 itself, with the transparent space being provided between the third sync bar 58 and the left border 481 of the logo 2. The scanning operation continues with the logo carrier 4 being indexed with the position being reached when the left border 481 is scanned and then across the logo 2 itself. The carrier and logo alignment bars 52 and 50 have a predetermined width to indicate that the logo itself is in position to be scanned. As previously mentioned, the bottom border 48*b* is black, thereby, establishing the proper transition at the top edge thereof from dark to light. Thus, the next transition point will be from light to dark when the dark area of the sector M of the logo is reached. The top border 48*t* also being mandatorily black indicates the end of the logo scan which is also established by the upper quad limit marker 68 to indicate that no further logo information is provided in that line of scan. The scanning and recording of the logo according to the transition format thus continues for the entire logo as previously described.

During the feed in operation when the logo carrier 4 is being advanced until the first sync bar 54 is reached rapid advance may be achieved by positioning the electron beam of the CRT at a central position, for example, between the code words A and B then moving the carrier 4 until the first dark area is reached, indicating the presence of the sync bar 54. At this point the logo carrier 4 would be stopped and the first scanning sequence of the entire bottom to top width of the carrier 4 would commence and proceed therefrom indicating that the logo 2 was in position to be scanned and recorded.

Figure 5:
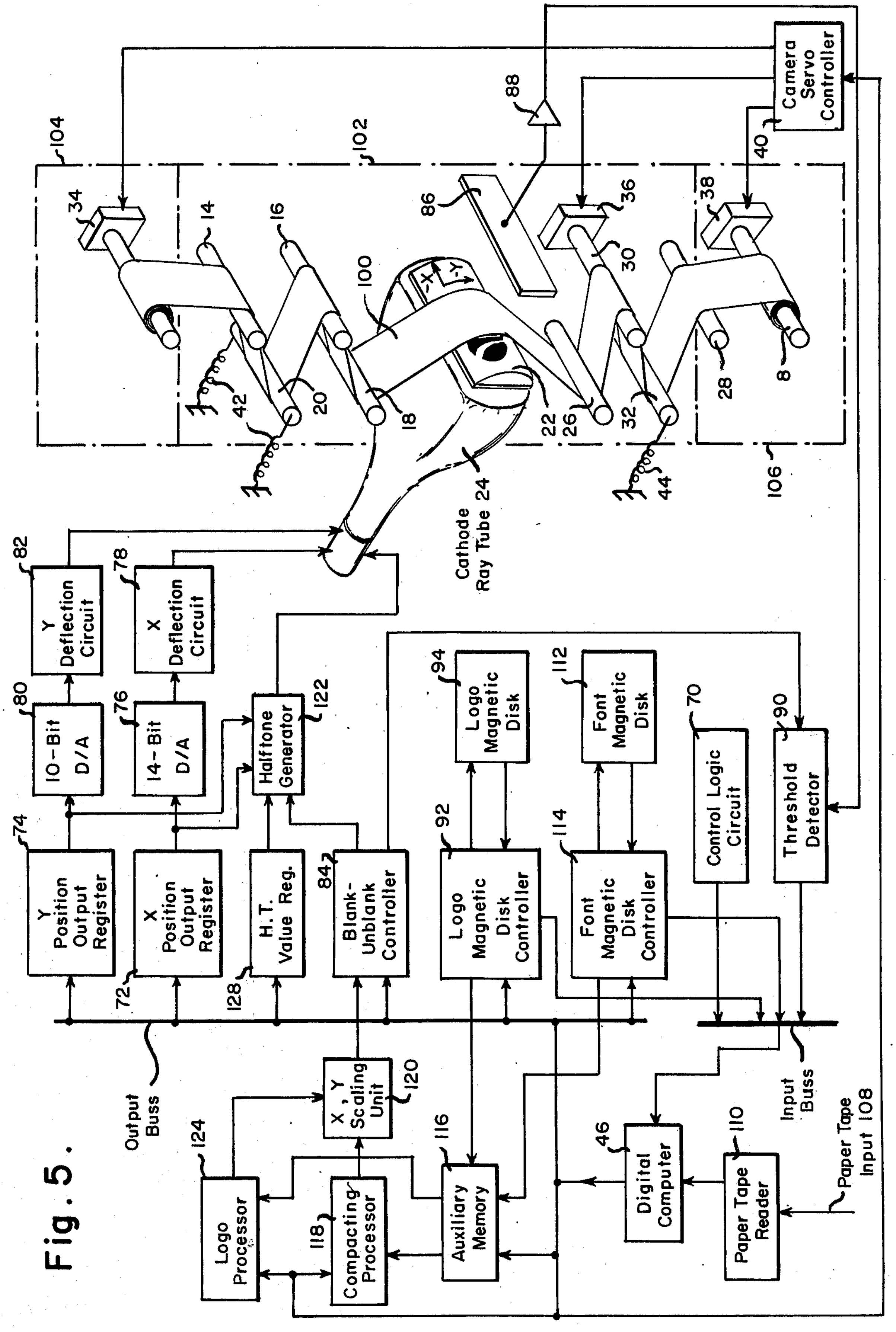
FIG. 5 is a block diagram of the present invention set up for its typeset mode of operation.

FIG. 5 shows phototypeset apparatus of the present invention set up for the typesetting mode of operation. In this mode of operation the logo carrier 4 is replaced by a photosensitive material 100 in the form of film or paper disposed within a camera shown schematically by the dotted block 102, having feed cassette 104 for dispensing the material 100 and a take-up cassette 106. Both cassettes 104 and 106 may be removably detached from the camera 102 for loading and processing respectively. The drive and tension control means for the material 100 is essentially the same as that described with respect to the logo carrier in FIG. 1. The material 100 is thus in a position to be exposed by the light output of the cathode ray tube culminated by the fiber optic faceplate 22 so that precise exposure can occur over the 1024 bit by 1024 bit format corresponding to the normalized em quad area.

The disposition of the material 100 between the faceplate 22 and photocell 86 thus prevents light from being transmitted to the photocell. The control logic circuit 70 is set to the typeset mode of operation and establishes the digital computer 46 for operation in this mode. The input source to be phototypeset is shown to be inputted as a paper tape input 108 into a paper tape reader 110, but the information can arrive via wire service, magnetic tape or direct computer link. The input source is suitably encoded to include the following data: The style of type to be employed from the up to one hundred styles stored in a font magnetic disc 112; the case of the type; the vertical and horizontal sizing factors; the position of the letter or symbol, on line or otherwise; slanting of the characters; the letter or symbol and other parameters as desired. As previously mentioned, the data recorded for each of the type styles is uniquely adapted for each particular font. The compacting processor 118 is designed to be responsive to provide the necessary output to generate the particular character demanded by the input.

The input source directs the digital computer 46 to request that the particular style of type recorded in the font magnetic disc 112 is read out under the control of the font magnetic disc controller 114. The selected style from the font magnetic disc 112 is translated through the font magnetic disc controller 114 to be stored in an auxiliary memory 116. The output of the font disc controller 12 is also provided to the digital computer 46 to instruct the computer of the location in the auxiliary memory 116 of the individual characters of the selected font. The function of the auxiliary memory 116 is to provide a fast access memory for the selected font rather than being required to employ the font disc 112.

Stored in the auxiliary memory 116 are a plurality of 16-bit word instructions suitable for use by the compacting processor 118 for the generation of the individual characters thereof according to the particular style of that font. As discussed in the Background portion of the present application, the function of the compacting processor is to permit the reproduction of various fonts of type while employing a substantially reduced memory capacity as compared to the bulk storage of each coordinate of the 1024 by 1024 array. Suitable method and apparatus for accomplishing this end are found in the above cited co-pending applications. The output generated by the compacting processor 118 in response to the instructions from the auxiliary memory 116 is in a transitional format since it must control the blanking and unblanking of the electron beam of the CRT 24.

The transitional output of the compacting processor 118 is supplied to an X-Y scaling unit 120 which also receives an input from the output buss defining the scaling factors desired for the particular character being generated. The transitional format outputted by the compacting processor 118 is in the normalized em quad format discussed above. By alternating the sampling rate in response to the X and Y scaling factor selected, the scaling unit 120 may thus be controlled.

The output of the scaling unit 120 is appled to the blank-unblank controller 84 which functions in the same manner as described with respect to the recording mode of operation. Thus whenever a light output is desired from the cathode ray tube 24, the controller 84 is unblanked; and is blanked if no light output is desired. In the present mode of operation, the halftone generator 122 shown connected between the blank-unblank controller 84 and the cathode ray tube 24, merely transfers the blank-unblank output of the controller 84 directly to the control grid of the cathode ray tube 24. Thus a light output is provided from the fiber optic faceplate 22 to expose the material 100 each time the controller 84 is unblanked and non-exposure occurs at the sampled point each time the CRT is blanked in response to the output from the scaling unit 120.

The deflection of the cathode ray tube 24 is controlled in a similar manner as that discussed with respect to the record mode, i.e., the digital computer 46 transmits X and Y digital coordinate positions to the register 72 and 74. The D/A converters 76 and 80 supply the proper analog signals to the X and Y deflection circuits 78 and 82, respectively.

Figure 6:
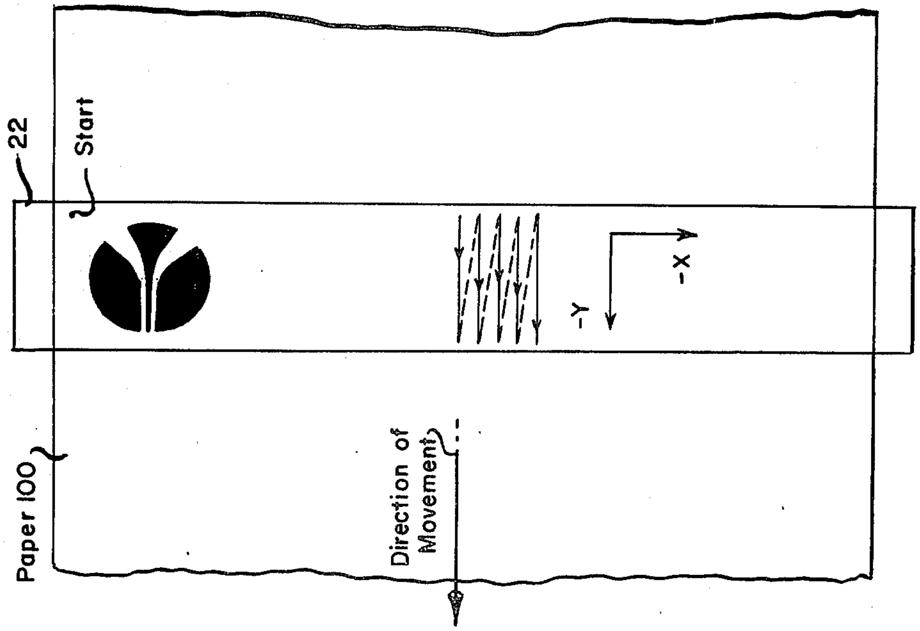
FIG. 6 is a schematic diagram used in explaining the typesetting mode of operation of FIG. 5.

Reference is now made to FIG. 6 which shows the orientation of a photosensitive material 100 having its photosensitive surface toward fiber optic faceplate 22 and the direction of scan as employed in the typeset mode of operation. The start of the scan is in the upper right hand corner of the faceplate 22 and proceeds as indicated on FIG. 6 in the $-Y$ direction for the fast scan and the $-X$ direction for the slow scan. Thus, a character is generated by exposing photosensitive material 100 from the bottom to the top of the character in fast scan and from left to right across the character in slow scan, with a line of characters being built up across the long dimension of the cathode ray tube faceplate 22.

FIG. 7 is a chart showing the difference in scan direction for the record and typeset modes respectively. In the record mode, the fast (bottom to top) scan is in the $+X$ direction, while in the typeset mode it is in the $-Y$ direction. In the record mode, slow (left to right) scan is across a character in the $+Y$ direction, while in the typeset mode this occurs in the $-X$ direction. The scan operation shown in the typeset mode of FIG. 6 is normal for setting complete lines of type. The advantages of employing the different scan pattern as shown in FIG. 3 for the record mode have been discussed above.

As long as characters appearing in the standard font stored in the auxiliary memory 116 are selected by the input paper tape 108, the process in the typeset mode will continue as described with individual letters being exposed on the material 100 in the $-X$ direction across the width of the material 100. In order to select a logo for phototypesetting that had previously been stored in the logo magnetic disc 94 during a record mode of operation of the system, the access address for the particular logo would be encoded in the paper tape input.

Presume that the logo shown in FIG. 2 is now desired to be phototypeset in response to the access address being punched on paper tape input 108, the digital computer 46 requests the logo magnetic disc 94 controller 92 to go to the particular requested address on the logo magnetic disc 94 and to output the 16-bit transitional data (see FIG. 4A) corresponding to the entire logo at that address. This is transmitted to the controller 92 to be stored in the auxiliary memory 116. The auxiliary memory 116 is selected to have a capacity at least sufficient to store a standard font from the font magnetic disc 112 and large parts of a logo from the logo magnetic disc 94. The computer 46 is also provided with an input from the controller 92 advising the computer of the address location of the information stored in the auxiliary memory 116 with respect to the selected logo.

A logo processor 124 receives an input from the output buss of the computer 46 and also from the auxiliary memory 116 and is operative to generate a transitional output corresponding to the transitional information originally recorded in the record mode. The transitional output of the logo processor 124 is applied to the scaling unit 120, which in response to the scaling information provided on the paper tape input 108 and translated by the computer 46, scales the logo output to the desired reproduction size. The output of the unit 120 is applied to the blank-unblank controller 84 which operates as previously described to cause a light output to occur in the unblanked condition and no light output to occur when blanked. The scanning operation of the CRT 24 proceeds as described previously, and the material 100 (as shown schematically in FIG. 6) is exposed in response to the light output from the CRT from the bottom to the top of the logo in the −Y direction and from left to right of the logo in the −X direction. The size and position of the logo on the paper would, of course, be controlled in response to the input instructions on the paper tape.

The phototypeset operation would thus continue in response to the paper tape input with characters being phototypeset according to the font selected and logos being phototypeset from those previously stored.

Figure 9:
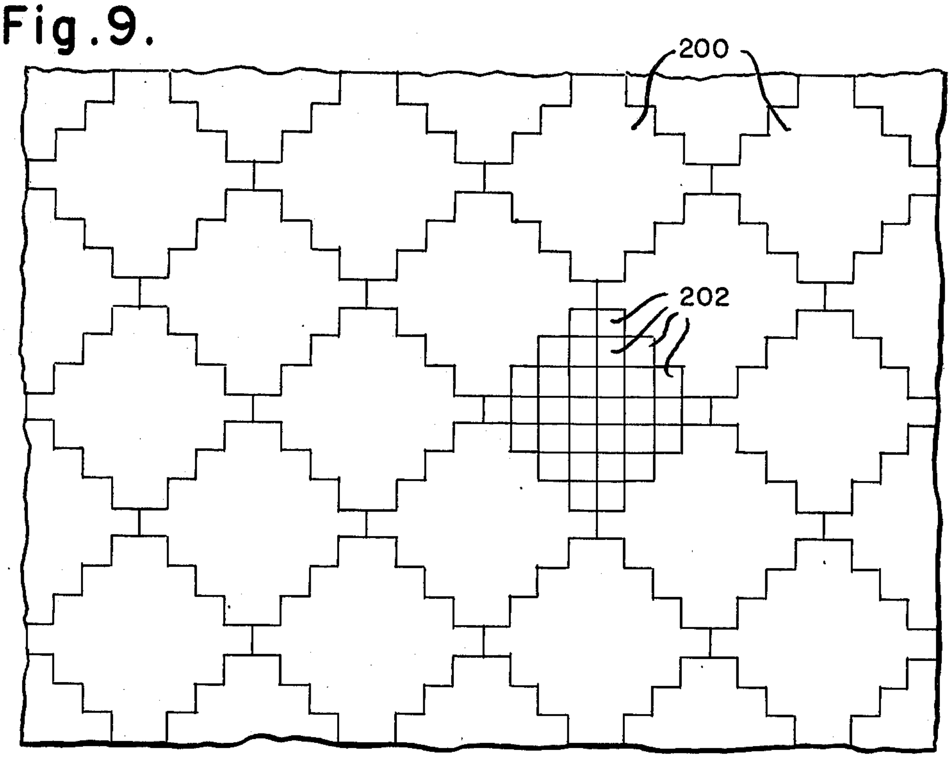
Figure 10:
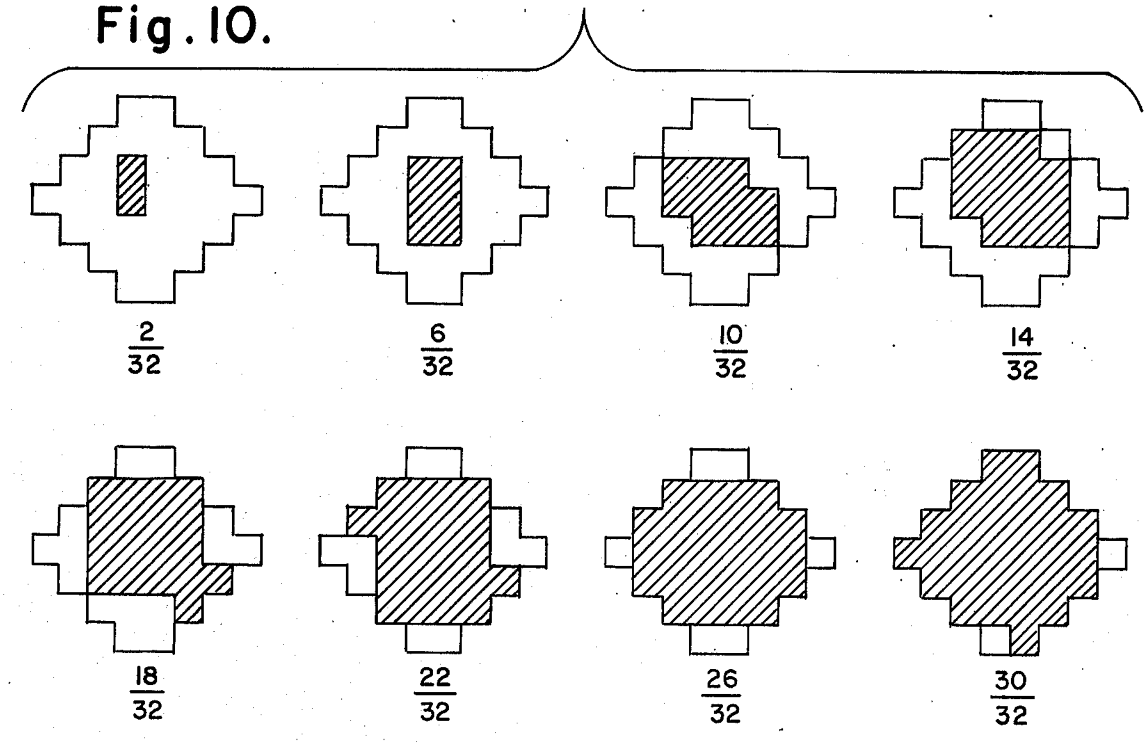

The halftone generating capability of the present system will now be considered with respect to FIGS. 5, 9, 10 and 11. The fiber optic faceplate 22 can be divided into an array of halftone cells 200 as shown in FIG. 9. In FIG. 9 each of the halftone cells 200 may be divided into 32 sectors 202, and each of the sectors 202 may, for example, comprise six sampling points in the normalized quad 1024 by 1024 format as discussed above. By activating selected pluralities of the 32 sectors 202 of the halftone cells 200, different densities of halftone reproduction may be obtained. Thus in FIG. 10 schematic density representations are shown of 2/32, 6/32, 10/32, 14/32, 18/32, 22/32, 26/32 and 30/32, with the numerator representing the number of light emitting sectors 202 out of the total cell 200 required for fulltone reproduction.

FIG. 11 shows the interconnection of a plurality of halftone cells 200 for 18/32 halftone reproduction. It should, of course, be understood that other arrays to produce the various halftone densities could be employed, and it may be desirable that different shapes and sizes of elements be interconnected for particular applications of halftone phototypeset reproduction.

In halftone reproduction, for example, 18/32 density were desired for the logo 2 as shown in FIG. 2, or for normal type, the input tape 108 would be encoded to represent this halftone density. The request for halftone operation can also be stored directly in the logo data — having been called for by the code words A and B. In response to tape reader 110 supplying the appropriate halftone input to the digital computer 46, a digital output would be provided by the computer 46 to a halftone value register 128, with the register 128 storing the digital word corresponding to the density 18/32. The output of the register 128 is supplied to the halftone generator 122, which also receives an input from the blank-unblank controller 84. The halftone generator 122 also receives inputs, respectively, from the Y position output register 74 and X position output register 72. Accordingly the halftone generator 122 receives input information defining the particular X, Y coordinate position of the cathode ray tube being sampled and also information as to whether in the density stored in the register 128, the sampled X, Y position is within a light-producing or a non-light producing sector of the halftone cell being scanned. If the position falls within a light-producing sector than any light output to be provided falls under the control of the blank-unblank controller 84. If an unblank signal is transmitted by the controller 84, the halftone generator 122 will not inhibit it but will transmit it to the control grid of the cathode ray tube 24 so that a light output is provided at that particular X–Y coordinate as would be the normal operation of the system. If, however, the sampled coordinate falls within a non light outputting sector of the halftone cell, even though the controller 84 supplies an unblank signal thereto, the halftone generator 122 will inhibit this output so that the cathode ray tube 24 will remain in its blanked state. Thus, a halftone pattern would be generated, with the halftone generator 122 blocking unblanking signals from the controller 84 whenever a point is being accessed that falls within a non-light-emitting sector of a halftone cell for the particular density pattern stored in the halftone value register 128 and translating unblanking signals to be the CRT 24 whenever the sampling point is within a light emitting sector.

After the halftone phototypesetting operation has been completed and fulltone operation is desired, the paper tape input 108 would designate normal operation. Therefore, the output of the blank-unblank controller 84 would be translated directly through the halftone generator 122 for directly controlling the blank-unblank output of the CRT 24. Phototypesetting under normal fulltone operation would then take place as described above.

Figure 8:
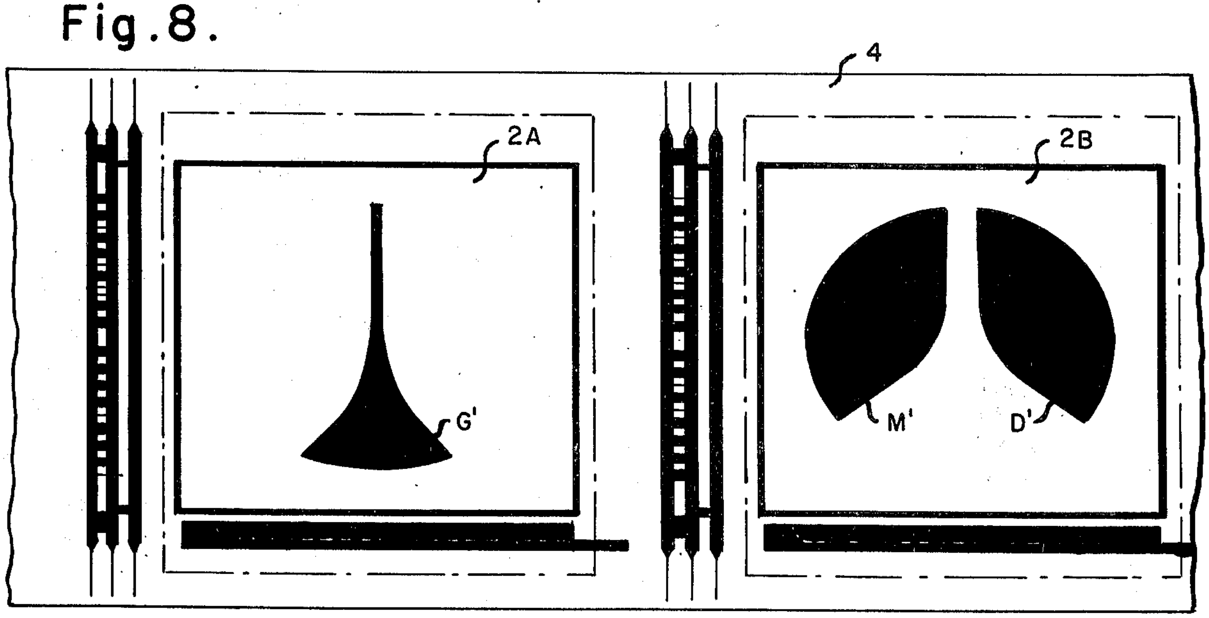
FIG. 8 is a schematic diagram of the logo carrier with two logos affixed thereto.

FIG. 8 shows the logo carrier 4 having two half side logos 2A and 2B affixed thereto for scanning and recording. The logos 2A and 2B are individually aligned and affixed with respect to the respective sync bars and code word areas in the X dimension and with respect to the bottom carrier alignment bars in the +Y direction through the use of the bottom logo alignment bars which are disposed on the logos 2A and 2B themselves, such as shown in more detail with respect to the logo 2 of FIG. 2. Logos 2A and 2B are laid out for superimposition one upon the other so that a composite logo is provided. Thus, the logo 2A comprises the center portion G′ as a subcharacter, while the logo 2B provides the left and right end portions M′ and D′ as a subcarrier to form the composite character to be reproduced. This provides greater flexibility in reproducing characters as desired for a particular application. Moreover, by separating the composite character into subcharacters, one of the subcharacters can be reproduced in halftone in the phototypesetting operation.

For example, if in the composite character to be phototypeset in FIG. 8, it were desired that the left and right end portions M′ and D′ be phototypset in halftone while the center portion G′ were to be reproduced in fulltone, this could be accomplished in the following manner. The code word area associated with the logo 2A would be encoded to indicate that a two-part logo was to be scanned and the scanning operation would continue after the first logo 2A had been scanned and recorded in the logo magnetic disc 94. The subcharacter portion G′ thus would be recorded in the manner as described above. The scanning operation would continue and the code word area associated with the logo 2B would indicate that halftone reproduction of the subcharacter of the logo 2B was destroyed and the particular halftone density would be indicated in the code word section. That halftone reproduction as desired would be recorded on the logo disc 94 as explained with respect to FIG. 4A the binary input (100) being provided in the bits 1, 2 and 3 thereof. The bits 6 through 15 would then be employed to indicate the halftone density requested. The scanning and recording operation would then continue as explained above with respect to FIG. 2. It should be noted that the art work for subcharacters G' and M' — D' would be made in the normal fulltone manner.

In the phototypeset mode, upon selecting the logo comprising the composite character of logos 2A and 2B, the central portion G' would be reproduced in fulltone at the normal phototypesetting operation. Superimposed and in registration with logo 2A would be phototypeset the logo 28, however, with the end portions M' and D' being phototypeset in halftone under the control of the density established in the code word associated therewith. Thus, a composite character comprising a fulltone central portion G' and halftone end portions M' and D' would be phototypeset on the photosensitive medium 100.

I claim:

1. A method of recording and phototypesetting a character having light and non-light transmitting areas in phototypesetting apparatus including light spot scanning means comprising the steps of:

disposing said character on a logo medium;

translating said logo medium with respect to a common scanning/photosetting station disposed in a fixed relation with respect to said scanning means, whereby the character is disposed in a position to be scanned thereby;

scanning a light spot with respect to the character with said scanning means and regularly turning on and off the light spot to sample said character at corresponding, predetermined locations;

sensing whether the location sampled is within a light or non-light transmitting area of said character;

recording character data indicating that a transition has been sensed in said character and the location thereof;

replacing said logo medium with a photosensitive medium;

transporting said photosensitive medium with respect to the common scanning/photosetting station to be in position to be exposed by the light spot output thereof;

providing input information indicating that the phototypesetting of said character recorded is desired; and controlling the light spot output of said scanning means in response to said input information and said character data so that said character is phototypeset on said photosensitive medium.

2. The method of claim 1, wherein:

said common station includes a faceplate having a longitudinal X axis and a transverse Y axis;

said carrier means translating said logo medium with respect to the Y axis so that said character is positioned with respect to the X–Y axes of said faceplate;

said character being scanned by sampling along the X axis and advancing along the Y axis.

3. The method of claim 2, wherein:

said photosensitive medium is translated along the Y direction;

said character is phototypeset along the Y direction and advanced along the X direction.

4. The method of claim 1, including steps of:

including in said input information that halftone reproduction of said character of a selected density is requested;

controlling the light output of said scanning means so that only selected portions of said character are phototypeset in accordance with the halftone density selected.

5. A method of recording and phototypesetting a character comprising first and second subcharacters having light and non-light transmitting areas in phototypesetting apparatus including light spot scanning means comprising the steps of:

disposing said first and second subcharacters on first and second logo media, respectively;

disposing said first and second logo media on carrier means each having a code word disposed thereon to provide control data;

translating said carrier means so that said code words and first and second subcharacters are disposed successively at a common scanning/photosetting station to be scanned by said scanning means;

successively scanning said code words and said first and second subcharacters with a light spot of said scanning means and regularly turning on and off the light spot to sample said first and second subcharacters at corresponding, predetermined locations;

sensing said code words and whether the location sampled is within a light or non-light transmitting area of said first and second subcharacters;

recording said control data in response to sensing said code words;

recording character data indicating that a transition has been sensed in said first and second subcharacters and the location thereof;

replacing said logo media with a photosensitive medium;

transporting said photosensitive medium with respect to the common scanning/photosetting station to be in position to be exposed by the light spot output thereof;

providing input information indicating that the phototypesetting of said character recorded is desired; and controlling the light spot output of said scanning means in response to said input information, said control data and said character data so that said character is phototypeset on said photosensitive medium.

6. The method of claim 5, wherein one of said first and second subcharacters is to be phototypeset in halftone:

said control data indicating that halftone phototypesetting of one of said subcharacters is required and the halftone density thereof;

said light output of said scanning means being controlled in response to said control data so that only selected portions of the one of said subcharacters is phototypeset in accordance with the halftone density indicated.

7. In phototypesetting apparatus including light spot scanning means and transporting means adaptable for disposing a photosensitive medium in position to be phototypeset in response to the light spot output of said scanning means provided in response to input information and recorded control and character data, the combination of:

first and second logo media including first and second subcharacters respectively having light and non-light transmitting areas, said first and second subcharacters comprising a composite character to be recorded and phototypeset;

a common scanning/photosetting station;

carrier means having code words and said first and second logo media disposed thereon for transporting so that said code words and said first and second subcharacters are placed in succession at said common station to be scanned by said scanning means;

means for causing said scanning means to scan said code words and said first and second subcharacters in a pulsed spot sequential manner to sample said subcharacters at predetermined locations;

means for sensing said code words and whether a location being scanned is within a light or non-light transmitting area of said subcharacters; and means responsive to said sensing means for storing control data in response to said code words and for storing character data indicating that a transition has been sensed in the first and second subcharacters and the location thereof.

8. The combination of claim 7 wherein said control data indicates that one of said subcharacters is to be phototypeset in halftone of a designated density and includes:

halftone means responsive to said recorded control data and said character data for controlling the light output of said scanning means so that only selected portions of said indicated subcharacter are phototypeset in accordance with the halftone density designated.

9. The combination of claim 7, comprising:

common image forming means disposed between said scanning means and said common station, whereby the light spot as derived from said scanning means is directed onto either of the photosensitive medium or the logo medium as disposed at said common station.

10. The combination of claim 9, wherein said image forming means comprises fiber optics for transporting the light spot from said scanning means to said common station.

11. The combination of claim 7, comprising:

composing means responsive to the stored control data in the form of code words and character data indicative of the first and second subcharacters as stored in said storing means for successively applying the stored data indicative of the first and second subcharacters to said scanning means, whereby the light spot is scanned onto the photosensitive medium disposed at said common station and the first and second subcharacters are imposed successively upon the photosensitive medium to form the composite character.

12. The method of claim 5, including the steps of:

transporting the photosensitive medium to bring an unexposed portion thereof to the common scanning/photosetting station and maintaining the unexposed portion of the photosensitive medium at said common station during the subsequent step, and controlling the light output of the scanning means in response to said output, said input information, said control data and said character data so that the first subcharacter is first photoset on the photosensitive medium and thereafter, the second subcharacter is photoset on the photosensitive medium in a position with respect to the first subcharacter that the composite character is thereby formed.

13. The method of claim 12, wherein there is included the step of:

controlling the light spot of said scanning during the photosetting of the second subcharacter in a manner different than that of the first subcharacter in accordance with the control data.

14. A method of recording a character including light and non-light transmitting areas for use in phototypesetting apparatus comprising the steps of:

disposing said character on a logo medium;

disposing said logo medium on carrier means;

transporting said carrier means with respect to a scanning station disposed in fixed relation to a source of a scanning light spot, so that said character is disposed at the scanning station to be scanned;

scanning the light spot with respect to said character and regularly turning on and off the light spot to sample said character at corresponding, predetermined locations;

providing a carrier alignment element on said carrier means having a predetermined relationship with respect to said scanning means;

providing a logo alignment element on said logo medium having a predetermined relationship with respect to said character so that said character can be aligned with respect to the scanning light spot by aligning said logo and carrier alignment elements;

sensing whether the location sampled is within a light or non-light transmitting area of said character; and recording character data indicating that a transition has been sensed in said character and the location thereof.

15. The method of claim 14, wherein:

said character is scanned by the light spot in the same sequence and directions as employed in the photosetting apparatus and at the same scanning station.

16. The method of claim 14, wherein:

scanning of said character occurs in X–Y coordinate directions;

said character is translated in the Y direction; and said character is scanned by sampling in the X direction and advancing in the Y direction.

17. The method of claim 14, including the steps of:

disposing first and second marks on the carrier means along the direction of the light spot scan and spaced from each other a distance corresponding to the extremities of the character to be scanned; and initiating and terminating the successive scans of the light beam at positions corresponding with the first and second marks.

18. In phototypesetting apparatus including light spot scanning means and transporting means adaptable for disposing at a common scanning/photosetting station a photosensitive medium in position to be phototypeset in response to the light spot output of said scanning means provided in response to input information and recorded character data, the combination of:

a logo medium including a character comprising light and non-light transmitting areas, said transporting means transporting the logo medium with respect to said common station;

carrier means having said logo medium disposed thereon for translating so that said character is placed at said common station to be sampled by said scanning means;

means for causing said scanning means to scan the light spot with respect to said character and for regularly turning on and off the light spot to sample said character at said common station;

said scanning means including a faceplate having a longitudinal X axis and a transverse Y axis;

said transporting means transporting said carrier means in the Y axis direction so that said character is aligned with respect to the X–Y coordinates of said faceplate;

said character being sampled sequentially at coordinate points along the X axis and advanced sequentially after each line of the X axis along the Y axis;

said character being phototypeset on said photosensitive material along the Y axis and advanced along the X axis;

means for sensing whether a location being scanned is within a light or non-light transmitting area of said character; and means responsive to said means for recording character data indicating that a transition has been sensed in the character and the location thereof.

19. In phototypesetting apparatus including light spot scanning means and transporting means adaptable for disposing at a common scanning/photosetting station a photosensitive medium in position to be phototypeset in response to the light spot output of said scanning means provided in the reponse to input information and recorded character data, the combination of:

a logo medium including a character comprising light and non-light transmitting areas, said transporting means transporting the logo medium with respect to said scanning station;

means for causing said scanning means to scan the light spot with respect to said character and for regularly turning on and off the light spot to sample said character at said common station;

means for sensing whether a location being scanned is within a light or non-light transmitting area of said character;

means responsive to said means for recording character data indicating that a transition has been sensed in the character and the location thereof; and halftone means responsive to said input information requesting halftone phototypesetting of said character of selected density and being operative to control the light output of said scanning means in response to said recorded character data so that only selected portions of said character are phototypeset in accordance with the halftone density requested.

20. In phototypesetting apparatus including light spot scanning means, the combination of:

a logo medium including a character disposed thereon comprising light and non-light transmitting areas;

a scanning station;

carrier means including said logo medium disposed thereon for translating said logo medium with respect to said scanning station so that said character is in position to be scanned thereby, said carrier means including a carrier alignment element disposed thereon in a predetermined relationship with respect to said scanning means;

means for causing said scanning means to scan said character as disposed at said scanning station and for regularly turning on and off the light spot to sample said character at corresponding, predetermined locations;

said logo medium including a logo alignment element disposed thereon in a predetermined relationship with respect to said character so that said character can be aligned with respect to said scanning means by aligning said logo and carrier alignment elements;

means for sensing whether a location being scanned is within a light or non-light transmitting area of said character; and means reponsive to said sensing means for recording character data indicating that a transition has been sensed in the character and the location thereof.

21. The combination of claim 20, wherein:

said carrier means including a code word disposed thereon in such a position to be scanned by said scanning means for supplying control data in response thereto in said apparatus.

22. The combination of claim 18, wherein said faceplate is divided into a plurality of cells, each of said cells comprising a plurality of sections and includes:

halftone generating means responsive to said input information requesting halftone phototypesetting of said character of a selected density and operative to permit only predetermined sectors of each of said cells of said faceplate to provide a light output therefrom so that only selected portions of said character are phototypeset in a predetermined arrangement of cells.

23. In phototypesetting apparatus including light spot scanning means, the combination of:

a logo medium including a character disposed thereon comprising light and non-light transmitting areas;

a scanning station;

means for translating incrementally said logo medium in a first direction past said scanning station;

means for controlling said scanning means to scan said character as disposed at said scanning station in a second direction substantially perpendicular to said first direction, to sample said character at predetermined locations;

means for sensing whether a location being scanned is within a light or non-light transmitting area of said character; and means responsive to said sensing means for recording character data indicating that a transition has been sensed in the character and the location thereof.

24. The combination of claim 23, wherein said scanning means scans the logo medium linearly in the second direction, and said logo medium includes indicia thereon for defining the extremities of the scan of the light spot by said scanning means.

25. The combination as claimed in claim 24, wherein said controlling means includes means responsive to the indicia carried by said logo medium for varying the length of the light spot scan in accordance therewith.

26. The combination of claim 23, wherein said scanning means scans the logo medium in the second direction, and said logo medium has first and second marks oriented along the second direction and defining the extremities of the character.

27. The combination of claim 26, wherein said controlling means is responsive to the position of the first and second marks thereby for controlling the scan length of the light spot.

28. The combination of claim 23, wherein said translating means incrementally translates and disposes a portion of said logo medium at said scanning station, and said controlling means causes said scanning means to scan a plurality of light spot scans of the logo medium portion, before said translating means translates the logo medium to the next successive portion thereof to be scanned.

29. The combination of claim 28, wherein said scanning means scans the light spot scan in the second direction, and the logo medium has first and second marks thereon oriented along the second direction of the light spot scan and defining the extremities of the character.

30. The combination of claim 29, wherein said controlling means is reponsive to the position of the first and second marks for controlling the length of the light spot scan in accordance therewith while the first portion of the logo medium is disposed at said scanning station.

* * * * *

UNITED STATES PATENT AND TRADEMARK OFFICE

CERTIFICATE OF CORRECTION

PATENT NO. : 4,038,493

DATED : July 26, 1977

INVENTOR(S) : John S. Richards

It is certified that error appears in the above-identified patent and that said Letters Patent are hereby corrected as shown below:

Column 2, Line 10, after "time" insert --and--.
Column 2, Line 23, delete "eh" and substitute --the--.
Column 2, Line 54, delete "cabability" and substitute --capability--.
Column 3, line 25, delete "threoded" and substitute --threaded--.
Column 3, Line 28, delete "(CRI)" and substitute --(CRT)--.
Column 3, Line 43, delete "bus" and substitute --buss--.
Column 4, Line 6, delete "bear" and substitute --bar--.
Column 4, Line 40, delete "a" and substitute --as--.
Column 4, Line 57, delete "nexy" and substitute --next--.
Column 5, Line 2, delete "y" and substitute --capital--.
Column 5, Line 6, after "hand" insert --corner--.
Column 5, Line 24, after "the", first occurrence, insert --X direction and 1" in the--.
Column 5, Line 32, delete "33" and substitute --x--.
Column 5, Line 33, delete "minimized" and substitute --minimizes--.
Column 6, Line 38, delete "0" and substitute --"0"-- and delete "1" and substitute --"1"--.
Column 12, Line 62, delete "destroyed" and substitute --desired--.
Column 13, Line 11, delete "28" and substitute --2B--.

Signed and Sealed this

*Fourteenth* Day of *March 1978*

[SEAL]

*Attest:*

RUTH C. MASON
*Attesting Officer*

LUTRELLE F. PARKER
*Acting Commissioner of Patents and Trademarks*